Patented Nov. 28, 1950

2,532,036

UNITED STATES PATENT OFFICE 2,532,036

PROCESS OF PREPARING POLYHYDRIC ALCOHOLS

John Robert Roach and Harold Wittcoff, Minneapolis, Minn., assignors to General Mills, Inc., a corporation of Delaware No Drawing. Application October 24, 1946, Serial No. 705,487

10 Claims. (Cl. 260—615)

The present invention relates to a process of preparing polyhydric alcohols from allyl ethers by a series of reactions.

For many purposes, polyhydric alcohols having a high degree of functionality are desirable; for example, in the protective coating field polyhydric alcohols esterified with unsaturated fatty acid groups are used in coatings because of their drying characteristics. The rate of drying of these compounds is dependent upon the degree of unsaturation and consequently upon the number of unsaturated fatty acid groups in the molecule. Accordingly, there have been attempts to produce polyhydric alcohols of increased functionality, such that they may be used for esterification with unsaturated fatty acids to produce drying compositions. Thus synthetic compounds such as pentaerythritol, 2,2,6,6-tetramethylolcyclohexanol, 3,3,5,5-tetramethylolpyran-4-ol, and other polyhydric alcohols resulting from the condensation of carbonyl-containing compounds with formaldehyde, have been made containing four to five hydroxyl groups per molecule. Other attempts to make use of polyhydric alcohols have involved the use of sugars and sugar alcohols. These, however, have not proved satisfactory because they demonstrate heat instability during subsequent esterification.

The present invention involves the preparation of polyhydric alcohols of a high degree of functionality by a series of reactions involving allyl ethers. One of these series of reactions involves the addition of hypohalous acid to the allyl ethers to form a halohydrin. This halohydrin may then be dehydrohalogenated to the epoxide, which may then be hydrolyzed to the polyhydric alcohol. As an alternative, the halohydrin may be hydrolyzed directly to the polyhydric alcohol.

It is, therefore, an object of the present invention to provide a process of producing polyhydric alcohols from the hypohalous acid addition products of allyl ethers.

The invention is applicable to a wide variety of allyl ethers. For example, from monoallylglycerol or from diallyl ether, it is possible to produce diglycerol. From alpha-alpha¹-diallylglycerol, triglycerol may be obtained, and from alpha-beta-diallylglycerol, there is obtained a branched chain triglycerol. From alpha-alpha¹-diallyldiglycerol, there is obtained tetraglycerol, whereas triallylglycerol yields a branched chain tetraglycerol. Tetraallylpentaerythritol yields an octahydric alcohol. From octaallylsucrose there is obtained a hexadecahydric alcohol. The above mentioned allyl ethers and products obtained therefrom are only illustrative. Other suitable allyl ethers include any allyl ether or substituted allyl ether of a di- or higher polyhydric material, such as ethyleneglycol, erythritol, xylitol, sorbitol, glucose, mannose, 2,2,6,6-tetramethylolcyclohexanol, 3,3,5,5-tetramethylolpyran-4-ol, tris-(hydroxymethyl)-aminomethane, diethanolamine, dihydroxystearic acid, and the like. In addition, there may be employed the allyl ethers of polysaccharides and of starch and cellulose.

The addition of the hypohalous acid may be effected according to any of a number of procedures; usually a dilute solution of hypohalous acid in water is reacted with unsaturated ether at a temperature below room temperature. The hypohalous acid may be prepared separately from the addition reaction mixture, or it may be prepared in situ. Hypochlorous acid, for example, may be prepared by the reaction of chlorine on mercuric oxide. The mercuric hypochlorite which is formed is then decomposed with nitric acid to yield hypochlorous acid. The allyl ether may then be added to this hypochlorous acid. It is also possible, for example, to mix the allyl ether in dilute aqueous medium with an alkaline earth hypochlorite such as calcium hypochlorite, and thereafter acidify the reaction mixture by means of gaseous carbon dioxide to precipitate calcium carbonate and to liberate hypochlorous acid which then adds to the unsaturated allyl ether.

Hypochlorous acid may also be prepared by the reaction of chlorine on sodium carbonate or bicarbonate in dilute aqueous solution. Hypobromous and hypoiodous acids may likewise be prepared by the action of bromine or iodine on mercuric oxide. It will be apparent, however, that any procedure of hypohalogenation may be employed.

After the addition has been effected, the product may be extracted from the aqueous medium with ether or, as an alternative, the water may be removed by evaporation to leave the halohydroxypropyl ether as a residue. This latter procedure is particularly applicable in the case where the hypohalous acid is generated from calcium hypohalite and carbon dioxide, since in that case, the calcium carbonate is insoluble and can be removed. The resulting aqueous reaction mixture then no longer contains inorganic salts in solution which would tend to contaminate a product obtained by evaporation of water.

The direct hydrolysis of the halohydrin resulting from the hypohalous addition may be accomplished by any base that is strong enough to hydrolyze the halogen atom, but which is not sufficiently strong to effect epoxide formation. For this purpose an aqueous sodium bicarbonate solution has been found satisfactory. The reaction may be carried out in an autoclave and after the reaction has been effected, the excess bicarbonate is neutralized and the mixture is evaporated. The resulting material may then be extracted with alcohol to obtain the product.

The formation of the polyhydric alcohol may also be accomplished through the preliminary formation of an epoxide from the halohydrin. The dehydrohalogenation may be accomplished by the use of solid sodium hydroxide suspended in ether or some equally inert solvent, or by the use of aqueous or alcoholic alkali. Temperatures for dehydrohalogenation generally need not exceed 50° C. In the event that ether or a similar inert organic solvent is used in the reaction, the product collects in the organic solvent, and may be recovered therefrom in a conventional manner.

The hydrolysis of the epoxides may be accomplished by any suitable procedure such as by heating with dilute acid as pointed out more fully in the examples.

The product obtained by this method is frequently composed of a mixture of compounds which is sometimes difficult to isolate. In some instances direct distillation is possible, but in other instances, this is not feasible. In such instances it has been found posssible to convert the polyhydric alcohol to an acetal such as the acetone derivative, and that this derivative is easily distillable. The isolated acetal may then be hydrolyzed to the alcohol.

*Example 1*

A solution of hypochlorous acid was prepared by passing chlorine into a mixture of mercuric oxide and ice at 0–5° C. When the mercuric oxide had dissolved, dilute nitric acid was added. Sufficient water was used in the preparation so that the concentration of the solution, as indicated by titration, was 3.16%. To one liter of this solution was added one mole of diallyl ether at 15–20° C. When a test sample no longer gave a yellow color with acidified potassium iodide, more hypochlorous acid solution was added until slightly more than the theoretical had been employed. The reaction mixture was then saturated with sodium sulfate and extracted with ether. The ether solution was dried over sodium sulfate and concentrated to obtain a product which distilled at 145–158° C. at 1 mm. and which possessed a chlorine content of 35.1% as compared to the theoretical value of 34.9%. The boiling point was then determined accurately on a purified sample as 138–139° C. at 1 mm.

A solution of 152.3 parts of the above hypochlorous acid addition product in 300 parts of ether was stirred while 66 parts of powdered and sieved sodium hydroxide was added in a period of 20 minutes. The temperature was kept 25–30° C. Thereafter the mixture was refluxed gently with stirring for four hours. Occasionally, the caustic was scraped from the sides of the vessel. The cooled mixture was filtered, and the residue was washed with ether. The combined filtrate and washings were concentrated. The product distilled at 69–70° C. at 1 mm. or at 98–99° C. at 11 mm. and possessed a refractive index at 25° C. of 1.4455. It was a colorless, mobile liquid which was quite stable.

The 2,3-epoxypropyl ether (25 parts) in 400 parts of 5% sulfuric acid was refluxed for four and one-half hours. Thereafter the solution was neutralized with barium hydroxide, centrifuged to remove the barium sulfate, and the centrifugate was concentrated under reduced pressure. There resulted a syrup which was distilled at 190–225° C. at 1 mm. and which possessed a refractive index at 20° C. of 1.4897. This was substantially pure diglycerol.

*Example 2*

The hypochlorous acid addition product of diallyl ether described in the first part of Example 1 (406 parts) was mixed with 6720 parts of 10% sodium bicarbonate. The mixture was placed in an autoclave under 100 pounds of steam pressure at 140–160° C. for two hours. Thereafter, the cooled solution was neutralized with concentrated hydrochloric acid and was concenerated under reduced pressure. The residue was taken up in absolute methanol, filtered, and concentrated to obtain a syrup. This syrup was treated with 300 parts of acetone into which had been bubbled 10 parts of anhydrous hydrogen chloride. This mixture, together with 50 parts of anhydrous sodium sulfate, was stirred overnight. Thereafter, the solution was neutralized with alcoholic caustic, filtered and desolvated to obtain chiefly diacetonediglycerol as indicated by a refractive index at 25° C. of 1.4372. This material distilled at 105–117° C. at 1 mm. There was also some higher boiling material (145–151° C. at 1 mm.; refractive index at 25° C.=1.4559) which was monoacetonediglycerol.

The combined isopropylidene derivatives were treated with 100 parts of water and ten parts of concentrated hydrochloric acid and were then heated on a steam bath for a few minutes. The volatile material was then removed under reduced pressure to yield substantially pure diglycerol.

By the term "allyl ether" it is meant to include substituted allyl ethers such as methallyl, crotyl, and the like, all of which contain the characteristic allyl type unsaturation.

While various modifications of the invention have been described, it is to be understood that the same is not limited thereto, but may be varied within the scope of the following claims.

We claim as our invention:

1. Process of producing a substantially pure polyglycerol which comprises mixing a substantially pure compound selected from the group consisting of diallyl ether and allyl ethers of glycerol and its polymers, in dilute aqueous solution with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, hydrolyzing the chlorohydrin thus formed by means of an alkali metal bicarbonate neutralizing the reaction mixture and recovering the polyglycerol formed.

2. Process of producing substantially pure diglycerol which comprises mixing substantially pure monoallylglycerol in dilute aqueous solution with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, hydrolyzing the chlorohydrin thus formed by means of an alkali metal bicarbonate at an elevated temperature and under pressure, neutralizing the reaction mixture and recovering the diglycerol formed.

3. Process of producing substantially pure diglycerol which comprises mixing substantially pure diallyl ether in dilute aqueous solution with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, hydrolyzing the chlorohydrin thus formed by means of an alkali metal bicarbonate at an elevated temperature and under pressure, neutralizing the reaction mixture and recovering the diglycerol formed.

4. Process of producing a substantially pure triglycerol which comprises mixing substantially pure alpha, alpha'-diallylglycerol in dilute aqueous solution with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, hydrolyzing the chlorohydrin thus formed by means of an alkali metal bicarbonate at an elevated temperature and under pressure, neutralizing the reaction mixture and recovering the triglycerol formed.

5. Process of producing a substantially pure branched-chain tetraglycerol which comprises mixing substantially pure triallylglycerol in dilute aqueous solution with an alkaline earth metal hypochlorite, thereafter acidifying the reaction mixture by means of carbon dioxide to precipitate alkaline earth metal carbonate and to liberate hypochlorous acid, maintaining the reaction mixture at a temperature between 0° C. and room temperature until the hypochlorous acid is consumed, removing the precipitated alkaline earth metal carbonate, hydrolyzing the chlorohydrin thus formed by means of an alkali metal bicarbonate at an elevated temperature and under pressure, neutralizing the reaction mixture and recovering the branched-chain tetraglycerol formed.

6. Process of producing substantially pure polyhydric alcohols from allyl ethers which comprises reacting a substantially pure allyl ether with a hypohalous acid at a temperature between about 0° C. and room temperature to form the halohydrin of the allyl ether, removing inorganic material from the reaction mixture, and hydrolyzing the residue to the polyhydric alcohol.

7. Process of producing substantially pure polyhydric alcohols from allyl ethers which comprises reacting a substantially pure allyl ether with a hypohalous acid at a temperature between about 0° C. and room temperature to form the halohydrin of the allyl ether, removing inorganic material from the reaction mixture, converting the residue to the epoxide by treatment of the residue with caustic alkali at a temperature not in excess of 50° C., removing inorganic material from the reaction mixture, and hydrolyzing the residue to the polyhydric alcohol by treatment with a strong mineral acid.

8. Process of producing substantially pure diglycerol which comprises reacting substantially pure monoallyl glycerol with a hypohalous acid at a temperature between about 0° C. and room temperature to form diglycerol monohalohydrin, removing inorganic material from the reaction mixture, and hydrolyzing the residue to diglycerol by treatment of the residue with a mild alkali under pressure and at an elevated temperature.

9. Process of producing substantially pure diglycerol which comprises reacting substantially pure diallyl ether with a hypohalous acid at a temperature between about 0° C. and room temperature to form diglycerol dihalohydrin, removing inorganic material from the reaction mixture, and hydrolyzing the residue to diglycerol by treatment of the residue with a mild alkali under pressure and at an elevated temperature.

10. Process of producing substantially pure triglycerol which comprises reacting substantially pure alpha, alpha'-diallyl glycerol with a hypohalous acid at a temperature between about 0° C. and room temperature to form the dihalohydrin, removing inorganic material from the reaction mixture, and hydrolyzing the residue to triglycerol by treatment of the residue with a mild alkali under pressure and at an elevated temperature.

JOHN ROBERT ROACH.
HAROLD WITTCOFF.

REFERENCES CITED

The following references are of record in the file of this patent:

UNITED STATES PATENTS

| Number | Name | Date |
| --- | --- | --- |
| Re. 22,347 | Evans | July 13, 1943 |
| 969,159 | Fleming | Sept. 6, 1910 |
| 2,258,892 | Harris | Oct. 14, 1941 |
| 2,302,121 | Harris | Nov. 17, 1942 |

Certificate of Correction

Patent No. 2,532,036 November 28, 1950

JOHN ROBERT ROACH ET AL.

It is hereby certified that error appears in the printed specification of the above numbered patent requiring correction as follows:

Column 4, line 66, strike out the words "formed by means of an alkali metal bicarbonate" and insert the same before "at an" in line 65, same column; and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*